Oct. 3, 1961 R. A. HENLE 3,003,071

TRANSISTOR LOGICAL CIRCUIT

Filed Dec. 31, 1957

| INPUT A | ON | OFF | ON | OFF |
|---|---|---|---|---|
| INPUT B | ON | OFF | OFF | ON |
| OUTPUT 1 | ON | ON | OFF | OFF |
| OUTPUT 2 | OFF | OFF | ON | ON |

*INVENTOR.*
ROBERT A. HENLE

*BY* Lester W. Clark

ATTORNEY 3,003,071
TRANSISTOR LOGICAL CIRCUIT
Robert A. Henle, Hyde Park, N.Y., assignor to International Business Machines Corporation, New York, N.Y., a corporation of New York
Filed Dec. 31, 1957, Ser. No. 706,509
7 Claims. (Cl. 307—88.5)

This invention relates to logical circuits, and particularly to a logical circuit for indicating correspondence or non-correspondence between two signal inputs. Such a logical circuit has two signal inputs and at least one signal output. Each signal input shifts between separated On and Off values. If both signal inputs correspond or are at the same value, whether that value is On or Off, then the output produces a particular signal, which may be On or Off. On the other hand, if there is disagreement or non-correspondence between the two inputs, i.e., if one is On and the other is Off, then the output produces a contrasting signal, i.e., either On or Off. Two complementary outputs may be provided, one of which produces an On signal when the other produces an Off signal.

An object of the present invention is to provide an improved logical circuit for indicating correspondence or non-correspondence of two signal inputs.

A further object is to provide an improved complemented EXCLUSIVE OR circuit.

Another object of the invention is to provide an improved circuit of the type described employing transistors as translating elements, and connected in fast acting switching circuits of the type described in the copending application of Hannon S. Yourke, Serial No. 622,307, filed Nov. 15, 1956, now Patent No. 2,964,652, granted December 13, 1960.

The foregoing and other objects of the invention are attained in the circuit described herein. The invention comprises a circuit employing four transistors connected substantially as grounded base amplifiers. The circuit has two signal inputs receiving square wave signals which may vary independently of each other, and two signal outputs at which complementary square wave signals are produced (i.e., the signal at one output is always the inverse of the signal at the other output). Two of the transistors are termed signal input transistors, and have their bases connected to the respective signal inputs, and their collectors connected together and to a first one of the signal outputs. The other two transistors are termed non-correspondence detecting transistors. The emitters of the non-correspondence detecing transistors are respectively connected to the emitters of the signal input transistors. The base of each non-correspondence detecting transistor is cross-connected to the emitter of the other non-correspondence detecting transistor. The collectors of the two detecting transistors are connected to each other and to the second of the signal outputs. The two outputs are connected to ground through output networks which may conveniently be interconnected, as shown.

When the two input signals are in correspondence, the two signal input transistors are biased forwardly and are On, while the other two transistors are Off, so that the currents in the output networks produce a particular set of output signals at the two complementary output terminals. If the input signals are different or in non-correspondence, then one of the two signal input transistors is cut off, and one of the non-correspondence detecting transistors is turned On, thereby producing a different set of current flows in the output networks and a different set of signals at the two complementary output terminals.

Other objects and advantages of the invention will become apparent from a consideration of the following specification and claims, taken together with the accompanying drawing.

Figures 1, 2:
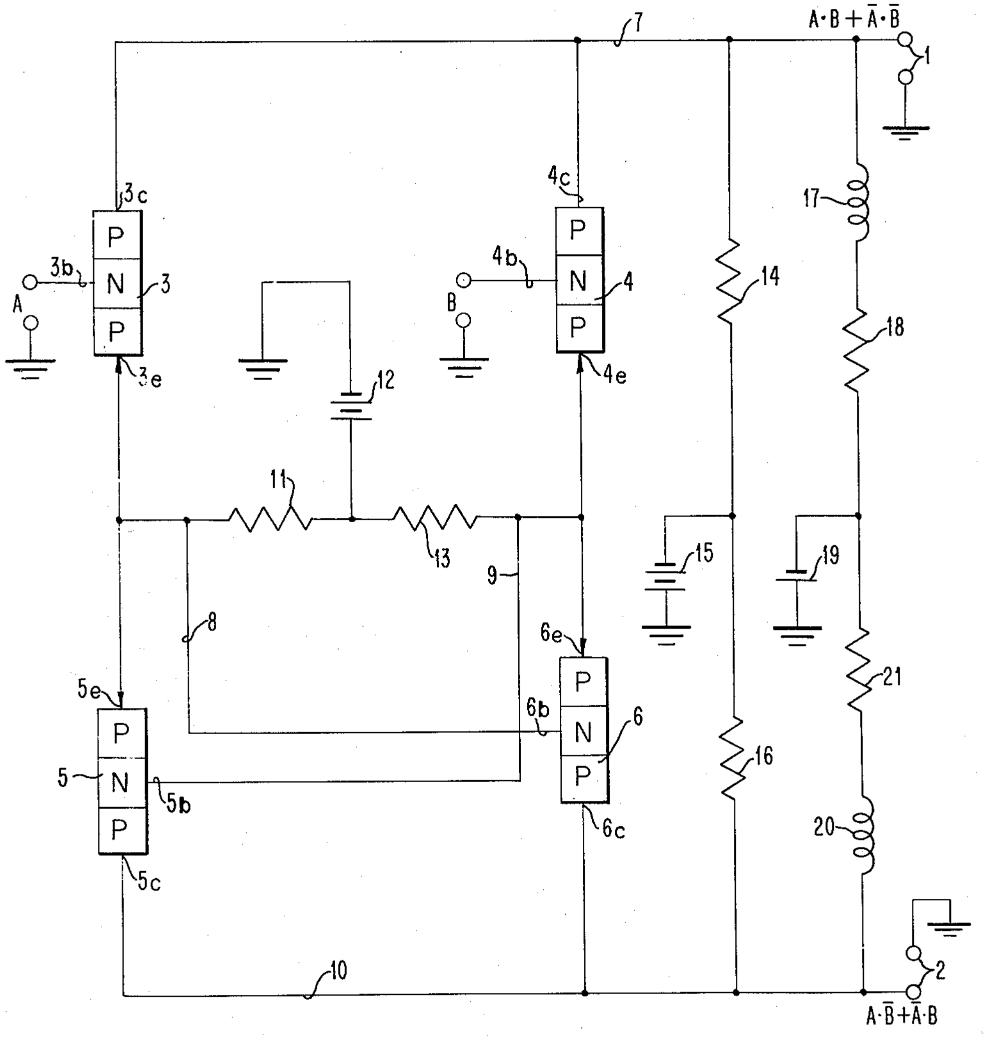
FIG. 1 is a wiring diagram of a logical circuit embodying the invention.
FIG. 2 is a table summarizing the operation of the circuit of FIG. 1.

The circuit of FIG. 1 has two sets of input terminals, respectively identified as input A and input B, and two sets of output terminals, respectively identified as output 1 and output 2. One terminal of each set is grounded.

The circuit comprises four transistors 3, 4, 5 and 6. For purposes of clarification and contrast, the transistors 3 and 4 are referred to herein as signal input transistors, and the transistors 5 and 6 are referred to as non-correspondence detecting transistors. Each of the transistors is a PNP junction transistor, and each has an emitter electrode identified by the reference numeral of the transistor with the letter *e* added, a base electrode identified by that reference numeral with the letter *b* added, and a collector electrode identified by that reference numeral with the letter *c* added.

The input A is connected between ground and the base **3*b* of transistor 3. Input B is connected between ground and base 4*b* of transistor 4. The collectors 3*c* and 4*c* are connected to a wire 7 which is also directly connected to the ungrounded output terminal 1. Emitters 3*e* and 5*e* are connected together and through a wire 8 to the base 6*b*. Emitters 4*e* and 6*e* are connected together and through a wire 9 to the base 5*b*. Collectors 5*c* and 6*c* are connected to a wire 10, which is also connected to the ungrounded output terminal 2**.

The emitters **3*e* and 5*e* are also connected to ground through a constant current source consisting of a resistor 11 and a battery 12. Emitters 4*e* and 6*e* are connected to ground through a constant current source consisting of a resistor 13 and the battery 12**.

An output network is connected between the wire 7 and ground. This network comprises one branch connected from wire 7 through a resistor 14 and a battery 15 to ground, and a second branch connected from wire 7 through an inductance 17, a resistor 18, and a battery 19 to ground. Another output network is connected between wire 10 and ground, and comprises a branch which may be traced from wire 10 through a resistor 16 and battery 15 to ground, and a second branch which may be traced from wire 10 through an inductane 20, a resistor 21 and battery 19 to ground.

Although the two output networks are shown as sharing the batteries 15 and 19, and that arrangement is to be preferred, nevertheless, separate batteries may be used, so that the two networks are connected only at ground.

*Operation*

In order to assist in an understanding of the operation of this circuit, certain values of potential, current and impedance, as used in a specific embodiment of the invention, will be assumed. These values are set forth in the table below. However, it should be understood that the invention is not limited to the use of these specific values, or any of them.

| | | |
|---|---|---|
| Resistor **11** | ohms | 10,000 |
| Battery **12** | volts | 41 |
| Resistor **13** | ohms | 10,000 |
| Resistor **14** | do | 6,800 |
| Battery **15** | volts | 44 |
| Resistor **16** | ohms | 20,000 |
| Inductance **17** | microhenrys | 5 |
| Resistor **18** | ohms | 300 |

| | | |
|---|---|---|
| Battery **19** | volts | 3 |
| Inductance **20** | microhenrys | 5 |
| Resistor **21** | ohms | 300 |

Assume that the input signals at input A and input B shift between On values of +0.6 volt and Off values —0.6 volt. Consider first the conditions existing when both inputs are at their Off value. Under those conditions, both the bases 3*b* and 4*b* are at —0.6 volt. The emitters 3*e* and 4*e* are positively biased by the battery 12, so that both emitter-base impedances are strongly forwardly biased, and both transistors 3 and 4 are delivering substantial current to the wire 7, and are described herein as being in their On condition. The potentials of the emitters 3*e* and 4*e* are determined by the potentials of the bases 3*b* and 4*b* plus the impedance drop across the emitter-base junction in its forward direction, which in typical junction transistors, when carrying substantial current, is fixed at about 0.3 volt. Consequently, both emitters 3*e* and 4*e* are at a potential of —0.3 volt. The principal current flow through the transistor 3 is through the emitter-collector path. Battery 12 and resistor 11 comprise a substantially constant current source which delivers about 4 ma. Similarly, battery 12 delivers about 4 ma. through resistor 13. These currents both flow into the wire 7 making a total of 8 ma. flowing toward the output network. The battery 15 and resistor 14 comprise a substantially constant current drain which takes approximately 6 ma., leaving an unbalanced current of 2 ma. which flows downwardly from wire 7 through the inductance 17 and resistor 18 and battery 19 to ground. The steady state potential across the output terminals 1 is determined by the potential drop produced by this current in the 300 ohm resistor 18. This is a drop of about 0.6 volt so that the output terminals 1 show an output signal potential of —2.4 volts, the potential of the battery 19 being 3.0 volts.

Considering the transistors 5 and 6 during conditions discussed above, it may be seen that the bases of the two transistors are at the same potentials as their emitters. Consequently, since there is no positive bias across the emitter-base junctions, these two transistors are cut off so that their collector currents are substantially zero. Transistors under such conditions are commonly said to be in their Off condition. The term On and Off as applied to transistors in this specification respectively mean a relatively high current condition and a relatively low current condition. Typically, but not necessarily, a transistor is operated in the cutoff region of its characteristic when it is Off and in the saturation region of its characteristic when it is On. The resistor 16 and battery 15 comprise a constant current drain which takes about 2 ma. When both transistors 5 and 6 are Off, and hence supplying no current, all of this 2 ma. current is supplied by battery 19 through resistor 21 and inductance 20, and produces a steady state drop in potential across resistor 21 of approximately 0.6 volt. This drop in potential establishes the output signal potential at the terminals 2, which is substantially —3.6 volts.

Note, with reference to the junction connected to the positive terminal of battery 19, that the current flow through resistor 18 is toward that junction and is equal to the current flowing away from the junction through resistor 21. Consequently, the battery 19 is not required to supply any current.

It has therefore been established that when both the input signals A and B are Off, the output terminals 1 produce a signal of —2.4 volts, which is hereinafter termed an On signal and the output terminals 2 produce an output signal of —3.6 volts, hereinafter termed an Off signal.

Consider the conditions existing when both the input signals A and B are On. Although the potential of the bases 3*b* and 4*b* is at +0.6 volt, the battery 12 is still effective to maintain the emitters 3*e* and 4*e* more positive than the base. Those emitters swing to a potential approximately 0.3 volt more positive than the bases, or about +0.9 volt. Again, both the transistors 3 and 4 are On and deliver substantially the same current as they did under the previous conditions. Again, there is no forward bias potential for either of the transistors 5 and 6, and both remain cut off. The current balance in the output network remains as before, so that the output terminals 1 continue to produce an On signal and the output terminals 2 continue to produce an Off signal.

Now consider the conditions existing when the input terminal A is On and the input terminal B is Off. Considering the transistor 4, it may be seen that its emitter-base impedance is biased forwardly by the combined effects of the input signal at B (−0.6 volt) applied to the base and the potential of battery 12 (41 volts) applied through resistor 13 to the emitter. Transistor 4 is therefore On, and the potential difference between its emitter and its base is the forward potential drop across the emitter-base impedance or about 0.3 volt. Emitter 4*e* is therefore at a potential of about −0.3 volt with respect to ground. This potential is transferred through wire 9 to base 5*b*, where it cooperates with the potential of battery 12, applied through resistor 11 to emitter 5*e*, to forward bias the base-emitter impedance of transistor 5. The potential difference between emitter 5*e* and base 5*b* is the forward potential drop across the base-emitter impedance, i.e., about 0.3 volt. Since base 5*b* is at −0.3 volt, as explained above, emitter 5*e* is at a potential of 0 volt. Since base 3*b* at this time is at a potential of +0.6 volt, it may be seen that the emitter-base impedance of transistor 3 is now reverse biased so that transistor 3 cuts off.

Considering transistor 6, it may be seen that its emitter 6*e* is at the same potential as emitter 4*e* (−0.3 volt) while its base is at the same potential as emitter 5*e* (0 volt). The base-emitter impedance of transistor 6 is therefore reverse biased, and it is in its Off or low current condition.

The current flow delivered to wire 7 from battery 12 is now only the flow through resistor 13 and transistor 4, or approximately 4 ma. The current flow from battery 12 through resistor 11 now passes through transistor 5 and wire 10. This current is the only current delivered to wire 10 from battery 12 and is also about 4 ma.

The current flow through the constant current drain resistor 14 remains at about 6 ma., only 4 ma. of which is supplied by the transistor 4. The other 2 ma. must be supplied by the branch circuit including battery 19 and resistor 18, and must flow toward the wire 7, i.e., so that the upper end of resistor 18 is more negative than the lower end, which is connected to the negative terminal (−3.0 volts) of battery 19. The flow of 2 ma. through that branch produces a potential drop across resistor 18 of 0.6 volt, so that the ungrounded output terminal 1 now swings to a potential of −3.6 volts.

The transistor 5 now supplies 4 ma. to the wire 10, only 2 ma. of which is taken by the constant current drain resistor 16, leaving a balance of 2 ma. to flow through the resistor 21 and battery 19. This produces a potential drop across resistor 21 of 0.6 volt, making the potential of the ungrounded output terminal 2 substantially −2.4 volts.

It may be seen that when input A is On and input B is Off, the output terminal 1 is switched to its Off value of −3.6 volts, and output terminal 2 is switched to its On value of −2.4 volts.

Again, the current through resistor 18 is the same in direction and value as the current through resistor 21, so that battery 19 does not supply any current.

Under the conditions previously described, when transistors 3 and 4 were On and transistors 5 and 6 were Off, current flowed in the branch 17, 18, 21, 20 from line 7 to line 10, and line 7 was positive with respect to line 10. Under the conditions just described, however, with transistor 3 Off and transistor 4 On, and with transistor 5 On and transistor 6 Off, line 10 is positive with respect to line 7, and the current flows from line 10 to line 7 through 20, 21, 18, 17.

Summarizing, it has been shown that when both inputs A and B receive corresponding signals, whether those signals are On or Off, then both transistors 3 and 4 are On, both transistors 5 and 6 are Off, and a particular current and potential distribution is established in the output networks, including terminals 1 and 2. On the other hand, when the signals at A and B do not correspond, then only one of transistors 3 and 4 is On and the other is Off. Similarly, only one of transistors 5 and 6 is On and the other is Off. A different current and potential distribution is then established in the output networks, and different signals appear at terminals 1 and 2. Consequently, it may be seen that the circuit checks the signals of input terminals A for correspondence with the signal of input terminals B. If those two signals correspond, then the output terminals 1 produce an On signal and output terminals 2 produce an Off signal. On the other hand, if the two input signals do not correspond, then output terminals 1 produce an Off signal and output terminals 2 produce an On signal.

On terms of logical notation, as indicated by the legends at the outputs 1 and 2 in the drawing, output 1 produces an On signal in response to A and B or not A and not B ($A.B+\overline{A}.\overline{B}$) and output 2 produces an On signal in response to A and not B or not A and B ($A.\overline{B}+\overline{A}.B$). Either output may be omitted if not needed.

The foregoing has been explained in terms of steady state conditions. The inductances 17 and 20 are provided to give a faster rise time when the output terminals switch from their On to Off conditions and vice versa. It should be noted that during the transient interval, the inductances 17 and 20 tend to maintain the current flow through the branch circuit. This current aids driving the load to a potential state opposite from that which existed before the transient state started. It is in a direction such as to add to the new direction of load current caused by the switching action. Thus transiently the current available for charging the load capacitance to the opposite state is enhanced by the current available from the inductance, and the switching action therefore takes place at a more rapid rate. At the completion of this transient period, current through the inductance reverses and the steady state drops through resistors 18 and 21 are such as to maintain the load at its new potential.

When considering the logical function of the circuit in terms of the output at terminals 1, the circuit may be described as a detector of correspondence or non-correspondence between the input signals at A and B. In other words, the circuit produces at terminals 1 an On signal if the signals A and B correspond and an Off signal if they do not correspond.

On the other hand, when considering the logical function in terms of the output at terminals 2, the circuit may be described as an EXCLUSIVE OR circuit. In other words, the circuit produces at terminals 2 an On signal if one or the other of inputs A and B is On but not if both A and B are On, nor if both are Off.

While reference has been made herein to constant current sources and to constant current drains, it will be recognized by those skilled in the art that these two terms are essentially equivalent, that the difference between a source and a drain is simply one of polarity or direction of current flow, and that in some circuits embodying the principles of the invention, the sources shown in the particular circuit disclosed herein would be replaced by drains, and the drains by sources.

The circuit disclosed above operates from a general input level of 0 volt to a general output level of —3 volts (the potential of battery 19). In order to connect such circuits in cascade, without having the general voltage rise along the chain of cascaded stages, it is desirable to alternate the PNP stage shown with a counterpart NPN stage. Such an NPN stage could be produced by replacing: the transistors 3, 4, 5 and 6 with NPN transistors; the battery 12 with a 44 volt battery having its polarity reversed from that shown in the drawing; the battery 15 with a 41 volt battery having its polarity reversed; and the battery 19 with a ground connection.

While I have shown and described a preferred embodiment of my invention, other modifications thereof will readily occur to those skilled in the art, and I therefore intend my invention to be limited only by the appended claims.

I claim:

1. A logical circuit comprising two signal inputs, first, second, third and fourth transistors, each having a base electrode, an emitter electrode and a collector electrode, means connecting the respective signal inputs to the base electrodes of the first and second transistors, first cross-coupling means directly connecting the emitter electrodes of the first and third transistors and the base electrode of the fourth transistor, second cross-coupling means directly connecting the emitter electrodes of the second and fourth transistors and the base electrode of the third transistor, said first and second cross-coupling means cooperating when said first and second transistors are both in relatively high current conduction states to maintain the base and emitter electrodes of the third and fourth transistors at the same potential, thereby keeping said third and fourth transistors in a state of relatively low conduction, and when only one of said first and second transistors is in its relatively high current conduction state and the other is in a relatively low current conduction state to bias the base-emitter impedance of one of said third and fourth transistors forwardly, thereby switching said one transistor to a state of relatively high current conduction, and signal output means connected to the collector electrodes of at least two of said transistors.

2. A logical circuit as defined in claim 1, including means effective when one of said third and fourth transistors is in its high current conduction state to switch one of said first and second transistors to a low conduction state.

3. A logical circuit as defined in claim 1, comprising a first constant current source connected between a common junction and the emitters of said first and third transistors, a second constant current source connected between said common junction and the emitters of said second and fourth transistors, said output means comprising a first constant current drain connected between said common junction and the collector electrodes of the first and second transistors, a second constant current drain connected between said common junction and the collector electrodes of the other transistors, and a variable current branch connected in parallel with said constant current drains, said branch being effective to balance the difference between the currents flowing from said sources and the current flowing to said drains.

4. A logical circuit as defined in claim 3, in which said branch includes an inductor connected in series therein and effective to retard any change in current flow therein, said inductor being effective during the transient interval occurring upon a change in the conductive condition of one of said transistors to supply a balancing current.

5. A logical circuit for detecting correspondence between two signals, comprising two signal inputs respectively receiving the signals, first, second, third and fourth transistors, each having a base electrode, an emitter electrode and a collector electrode, means connecting the respective signal inputs to the base electrodes of the first and second transistors, a first junction connected directly to the emitter electrodes of the first and third transistors and to the base electrode of the fourth transistor, a second junction connected directly to the emitter electrodes of the second and fourth transistors and to the base electrode of the third transistor, a first constant current source connected to the first junction, a second constant current source connected to the second junction, a third junction connected directly to the collector electrodes of the first and second transistors, a fourth junction connected directly to the collector electrodes of the third and fourth transistors, a first constant current drain connected between a fifth junction and said third junction, a second constant current drain connected between said fifth junction and said fourth junction, a variable current branch circuit connected between said third and fourth junctions, and an output terminal connected directly to one of said third and fourth junctions.

6. A logical circuit as defined in claim 5, including a second output terminal connected directly to the other of said third and fourth junctions.

7. A logical circuit comprising two transistors, each having an emitter electrode, a collector electrode, and a base electrode, two signal inputs connected to the respective base electrodes, two constant current sources connected between a common junction and the respective emitter electrodes, a constant current drain connected between said junction and both collector electrodes, a variable current branch connected between said junction and both collector electrodes, connections between the respective emitters of said transistors and said variable current branch, and means in said connections for cutting off flow of current in both said connections when said transistors are in the same conductive condition, whereby current flow is established in a given direction in said branch, and for establishing current flow in one of said two connections while cutting off current flow in the other of said connections when said transistors are in different conductive conditions, whereby current flow is established in the reverse direction in said branch, said branch including an inductor connected in series therein and effective to retard any change in current flow therein, said inductor being effective during the transient interval occurring upon a change in the conductive condition of one of said transistors to maintain the balance between current supply and current drain.

References Cited in the file of this patent

UNITED STATES PATENTS

| | | |
|---|---|---|
| 2,733,424 | Chen | Jan. 31, 1956 |
| 2,816,237 | Hageman | Dec. 10, 1957 |
| 2,831,984 | Ebers | Apr. 22, 1958 |
| 2,880,331 | MacSorley | Mar. 31, 1959 |

OTHER REFERENCES

"Transient Analysis in Electrical Engineering," by S. Fich, published by Prentice Hall, N.Y., 1951, pages 37 and 38.